US009196088B2

(12) United States Patent
Ding et al.

(10) Patent No.: US 9,196,088 B2
(45) Date of Patent: Nov. 24, 2015

(54) SYSTEM AND METHOD FOR CLASSIFICATION OF THREE-DIMENSIONAL MODELS IN A VIRTUAL ENVIRONMENT

(71) Applicant: Robert Bosch GmbH, Stuttgart (DE)

(72) Inventors: Zi'ang Ding, West Lafayette, IN (US); Lincan Zou, Sunnyvale, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 13/829,145

(22) Filed: Mar. 14, 2013

(65) Prior Publication Data

US 2014/0267229 A1  Sep. 18, 2014

(51) Int. Cl.
  *G06T 17/05*  (2011.01)
  *G09B 25/04*  (2006.01)
(52) U.S. Cl.
  CPC ............... *G06T 17/05* (2013.01); *G09B 25/04* (2013.01)
(58) Field of Classification Search
  None
  See application file for complete search history.

(56) References Cited

U.S. PATENT DOCUMENTS

| 7,746,343 | B1 | 6/2010 | Charaniya et al. |
| 7,822,541 | B2 * | 10/2010 | Kumagai et al. ............. 701/436 |
| 2008/0273034 | A1 | 11/2008 | Fenney et al. |
| 2011/0140928 | A1 | 6/2011 | Ren et al. |
| 2013/0321392 | A1 * | 12/2013 | van der Merwe et al. .... 345/419 |

FOREIGN PATENT DOCUMENTS

| WO | 2011120152 A1 | 10/2011 |
| WO | 2012037157 A2 | 3/2012 |

OTHER PUBLICATIONS

Decarlo et al, "Suggestive Contours for Conveying Shapes", SIGGRAPH, 2003, pp. 845-855 (8 pages).
International Search Report and Written Opinion corresponding to PCT Application No. PCT/US20141023011, mailed Jul. 7, 2014 (9 pages).
Tomohiro Fukuda et al., "A Study of Variation of Normal of Polygons Created by Point Cloud Data for Architectural Renovation Field", In: Proceedings of the 16th International Conference on Computer-Aided Architectural Design Research in Asia, 2011, pp. 321-330, Hong Kong (10 pages).

* cited by examiner

*Primary Examiner* — Edward Martello
(74) *Attorney, Agent, or Firm* — Maginot Moore & Beck LLP

(57) ABSTRACT

A method for classification of three-dimensional structures in a virtual environment includes identifying a plurality of polygons in a structure located in a virtual environment, identifying a plurality of surface normals, each surface normal corresponding to one polygon in the plurality of polygons that are in the structure, identifying a variance of a distribution of the plurality of surface normals, generating a first classification for the structure in response to the variance being less than a predetermined threshold, and generating a graphical display of the structure with at least one visual aspect of the structure being modified with reference to the first classification.

28 Claims, 8 Drawing Sheets

SYSTEM AND METHOD FOR CLASSIFICATION OF THREE-DIMENSIONAL MODELS IN A VIRTUAL ENVIRONMENT

FIELD

This disclosure relates generally to the field of computer graphics and, more specifically, to systems and methods that display three-dimensional graphics.

BACKGROUND

Many modern software applications display three-dimensional representations of structures and scenes as part of a user interface. Three-dimensional (3D) graphics are used in a wide range of applications including video games, simulations, virtual reality applications, geospatial information applications, and applications for mapping and navigation. In many applications, 3D graphics are more useful than two-dimensional (2D) graphics at depicting real-world environments and locations because the normal interaction between humans and the real-world occurs in three dimensions.

In one form of 3D graphics, different objects in a scene are formed from a large number of polygons. The polygons form shapes and structures in a 3D scene. Since most computing devices only display graphics with a two-dimensional display, the 3D graphics are converted into a rasterized array of two-dimensional pixels for display. The 2D display depicts portions of the three-dimensional scene in a manner similar to how a camera takes a two-dimensional photograph of 3D scenes in the real world. Many 3D graphics systems and application programming interfaces (APIs), which include the Open Graphics Library (OpenGL) and the Direct 3D APIs, provide common structures and interfaces to specialized graphics hardware for generation of 3D images in an efficient manner. The 3D software interacts with general purpose and specialized digital computing hardware that generates the 3D graphics in an efficient manner. In particular, graphical processing units (GPUs) are hardware components that are configured to generate polygons and other graphical effects that form a 3D scene. Modern computing devices typically execute software with a combination of instructions for a central processing unit (CPU) and a GPU to generate the 3D scene and enable interaction with the 3D scene in some software applications. In some hardware embodiments, the functionality of the CPU and GPU are merged together, physically and optionally logically, into a single system on a chip (SoC) device.

Some 3D software applications are used to model virtual environments that correspond to real-world environments. For example, mapping and navigation applications produce 3D graphical depictions of a geographic region to assist a user in finding a point of interest or navigating to a destination. The 3D environment includes a large number of objects that represent real-world structures, including natural landmarks, roads, buildings, and other man-made structures. In addition to displaying the 3D objects in the virtual environment, the mapping and navigation applications often provide additional information about the objects in the environment. For example, mapping and navigation applications often highlight roads and display road names or numbers to assist in navigation. Mapping programs often display names and links to websites for points of interest around the map. Many devices that display 3D virtual environments are also connected to external databases through data networks, such as wireless data networks. The external databases store 3D models that depict roads, buildings, and other structures in a geographic region.

While 3D models that are loaded from external databases can be displayed in the virtual environment, the 3D objects often lack classification information to identify what the 3D model represents. For example, a 3D object that depicts a section of a highway does not include information that distinguishes the highway from another 3D object that depicts an office building. In order to display the 3D objects in an accurate context, a mapping or navigation program needs to classify the 3D objects in the virtual environment. Consequently, improvements to systems and methods for classifying and displaying 3D objects in a virtual environment would be beneficial.

SUMMARY

In one embodiment, a method for classifying and displaying a structure in a virtual environment has been developed. The method includes identifying a plurality of polygons in a structure located in a virtual environment, generating data corresponding to a plurality of surface normals, each surface normal corresponding to one polygon in the plurality of polygons in the structure, identifying a variance of a distribution of the plurality of surface normals, generating a first classification for the object in response to the identified variance being below a first predetermined threshold, and generating with a display device a visual depiction of the structure in the virtual environment with at least one visual aspect of the structure being modified with reference to the first classification.

In another embodiment, a system that classifies and displays a structure in a virtual environment has been developed. The system includes a memory configured to store data corresponding to a plurality of polygons in a structure in a virtual environment and data corresponding to a plurality of textures for structures in the virtual environment. The system also includes a display device configured to generate a display of the structure in the virtual environment and a processor operatively connected to the memory and the display. The processor is configured to generate data corresponding to a plurality of surface normals for the data corresponding to the plurality of polygons in the structure, each surface normal corresponding to one polygon in the plurality of polygons in the structure, identify a variance of a distribution of the plurality of surface normals, generate a first classification for the object in response to the identified variance being below a first predetermined threshold, and generate with the display device a visual depiction of the structure in the virtual environment with at least one visual aspect of the structure being modified with reference to the first classification.

DETAILED DESCRIPTION

Figure 1:
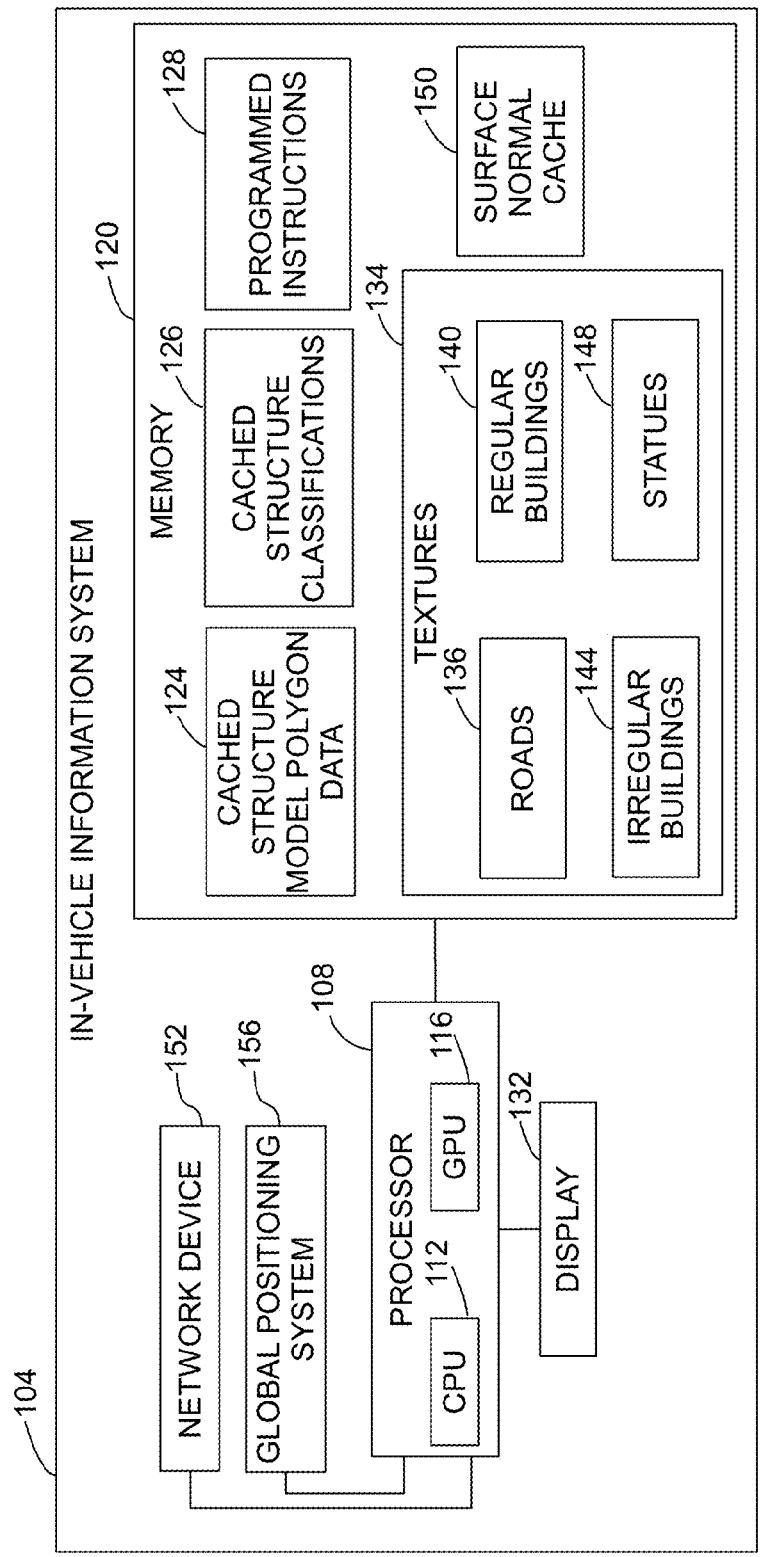
FIG. 1 is a schematic diagram of a navigation system including an in-vehicle information system that is configured to display structures in a 3D virtual environment.

For the purposes of promoting an understanding of the principles of the embodiments disclosed herein, reference is now made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "in-vehicle information system" refers to a computerized system that is associated with a vehicle for the delivery of information to an operator and other occupants of the vehicle. In motor vehicles, the in-vehicle information system is often physically integrated with the vehicle and is configured to receive data from various sensors and control systems in the vehicle. In particular, some in-vehicle information systems receive data from navigation systems including satellite-based global positioning systems and other positioning systems such as cell-tower positioning systems and inertial navigation systems. Some in-vehicle information system embodiments also include integrated network devices, such as wireless local area network (LAN) and wide-area network (WAN) devices, which enable the in-vehicle information system to send and receive data using data networks. In an alternative embodiment, a mobile electronic device provides some or all of the functionality of an in-vehicle information system. Examples of mobile electronic devices include smartphones, tablets, notebook computers, handheld GPS navigation devices, and any portable electronic computing device that is configured to perform mapping and navigation functions. The mobile electronic device optionally integrates with an existing in-vehicle information system in a vehicle, or acts as an in-vehicle information system in vehicles that lack built-in navigation capabilities including older motor vehicles, motorcycles, aircraft, watercraft, and many other vehicles including, but not limited to, bicycles and other non-motorized vehicles.

As used herein, the term "object" refers to data that correspond to a group of polygons in a virtual environment that form a model of a single object in the larger virtual environment. As used herein, the term "structure" refers to an object with polygons that are positioned and oriented in the 3D virtual environment to stand on a virtual representation of ground or the surface of the earth. Common examples of structures include representations of manmade objects such as buildings, bridges, monuments, and other artificial constructions.

As used herein, the term "surface normal" refers to a vector that extends from the surface of a polygon in a perpendicular direction to the plane of the polygon in a three-dimensional space. One technique that is known to the art for generation of a surface normal vector is to perform a cross-multiplication of two vectors that correspond to two non-parallel sides of the polygon.

FIG. 1 depicts an in-vehicle information system 104 that is configured to generate a display of a 3D virtual environment. The in-vehicle information system 104 includes a processor 108, a memory 120, display device 132, network device 152, and a global positioning system device 156. The memory 120 stores cached polygon data 124 corresponding to one or more structures that are displayed in a 3D virtual environment, cached classification identifiers 126 corresponding to the structures, programmed instruction data 128, texture memory 134, and an optional cache of surface normal data 150, which includes vector data of surface normals for the polygons in the structure data 124.

In the in-vehicle information system 104, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, network device 152, and global positioning system 156, into a single integrated device. In one embodiment, the CPU is a commercially available central processing device that implements an instruction set such as one of the x86, ARM, Power, or MIPs instruction set families. The GPU includes hardware and software for display of both 2D and 3D graphics. In one embodiment, processor 108 includes software drivers and hardware functionality in the GPU 116 to generate 3D graphics using the OpenGL, OpenGL ES, or Direct3D graphics application programming interfaces (APIs). For example, the GPU 116 includes one or more hardware units including geometry processing units, vertex shader units, fragment shader units, and image rasterization units for the generation of a rasterized 2D depiction of a 3D virtual environment. During operation, the CPU 112 and GPU 116 execute stored programmed instructions 128 that are retrieved from the memory 120. In one embodiment, the stored programmed instructions 128 include operating system software and one or more software application programs, including a mapping and navigation application program. The processor 108 executes the mapping and navigation program and generates 2D and 3D graphical output corresponding to maps and map features through the display device 132.

The memory 120 includes both non-volatile memory and volatile memory. The non-volatile memory includes solid-state memories such as NAND flash memory, magnetic and optical storage media, or any other suitable data storage device that retains data when the in-vehicle information system 104 is deactivated or loses electrical power. The volatile memory includes static and dynamic random access memory (RAM) that stores software and data, including graphics data and map feature data, during operation of the in-vehicle information system 104.

In in-vehicle information system 104, the memory 120 stores the cache of structure data 124. The data for each structure includes a plurality of vertex coordinates for polygons that form the structure. In some embodiments, the processor 108 retrieves structure data from one or more online data storage systems using the network device 152. As described below, the processor 108 is configured to identify a classification for one or more structures in the memory 120, and the cached structure classifications store generated classification data for each structure in association with the structure data 124. The processor 108 performs the classification process once for each structure and subsequently generates a graphical depiction of the structure with selected textures from the texture memory 134. In the embodiment of FIG. 1, the texture memory stores one or more textures that correspond to roads 136, regular buildings 140, irregular buildings 144, and statues 148. The textures stored in the memory 134 provide more uniform appearances to a wide range of structures that are displayed in the virtual environment to provide a simplified depiction of the virtual environment to occupants in the vehicle.

In the embodiment of FIG. 1, the processor 108 sends and receives data using the network device 152. In a vehicle, the network device 152 is often a wireless network device, such as a wireless wide-area network (WWAN) device, which communicates with radio transceivers in a cellular data network while the vehicle is in motion. The network device 152 optionally includes a wireless local area network (WLAN) device for communication with shorter-range wireless local area networks. Examples of WLAN devices include the IEEE 802.11 family of protocols and Bluetooth protocols. In some embodiments, the network device 152 includes a wired network connection, such as Ethernet or USB, for use when the vehicle is parked or for interfacing with another computing device in the compartment of the vehicle. In the system 104, the processor 108 optionally retrieves polygon data corresponding to one or more of the structure models in the structure model cache 124 from online data services (not shown) using the network device 152.

In the in-vehicle information system 104, the global positioning system (GPS) 156 identifies a location of the vehicle for use in navigation applications. In one embodiment, the GPS 156 includes a radio receiver that receives signals from orbiting navigation satellites. Commercially available satellite GPS receivers are integrated in some in-vehicle information systems, and many mobile electronic devices include satellite GPS receivers as well. In an alternative embodiment, the global positioning system 156 receives signals from terrestrial transmitters including WWAN and WLAN transmitters. The global positioning system 156 identifies a location of the vehicle using triangulation or other geolocation techniques. Some embodiments include receivers for both satellite GPS and terrestrial signals. In some embodiments, the global positioning system 156 further includes an inertial navigation system that assists in identifying the location of the vehicle if signals from the satellite or terrestrial transmitters are unavailable. During operation, the processor 108 receives data from the GPS 156 to identify a geographic location of the vehicle. The processor 108 selects a portion of the virtual environment and structures in the virtual environment that correspond to the identified geographic location of the vehicle for display during a navigation operation.

The in-vehicle information system 104 includes one or more display devices 132. In one embodiment, the display device 132 is a liquid crystal display (LCD), organic light-emitting diode display (OLED) or other suitable display device that generates image output for the vehicle occupants. Displays are commonly mounted in a dashboard or other fixed location in the vehicle. In an alternative embodiment, the display device 132 is a head-up display (HUD) that is projected onto a windshield of a vehicle or projected onto goggles or glasses that are worn by an occupant in the vehicle. In an embodiment where the in-vehicle information system is a handheld mobile electronic device, the display 132 is typically an LCD or organic LED (OLED) flat panel display that is housed in the mobile electronic device.

Figure 2:
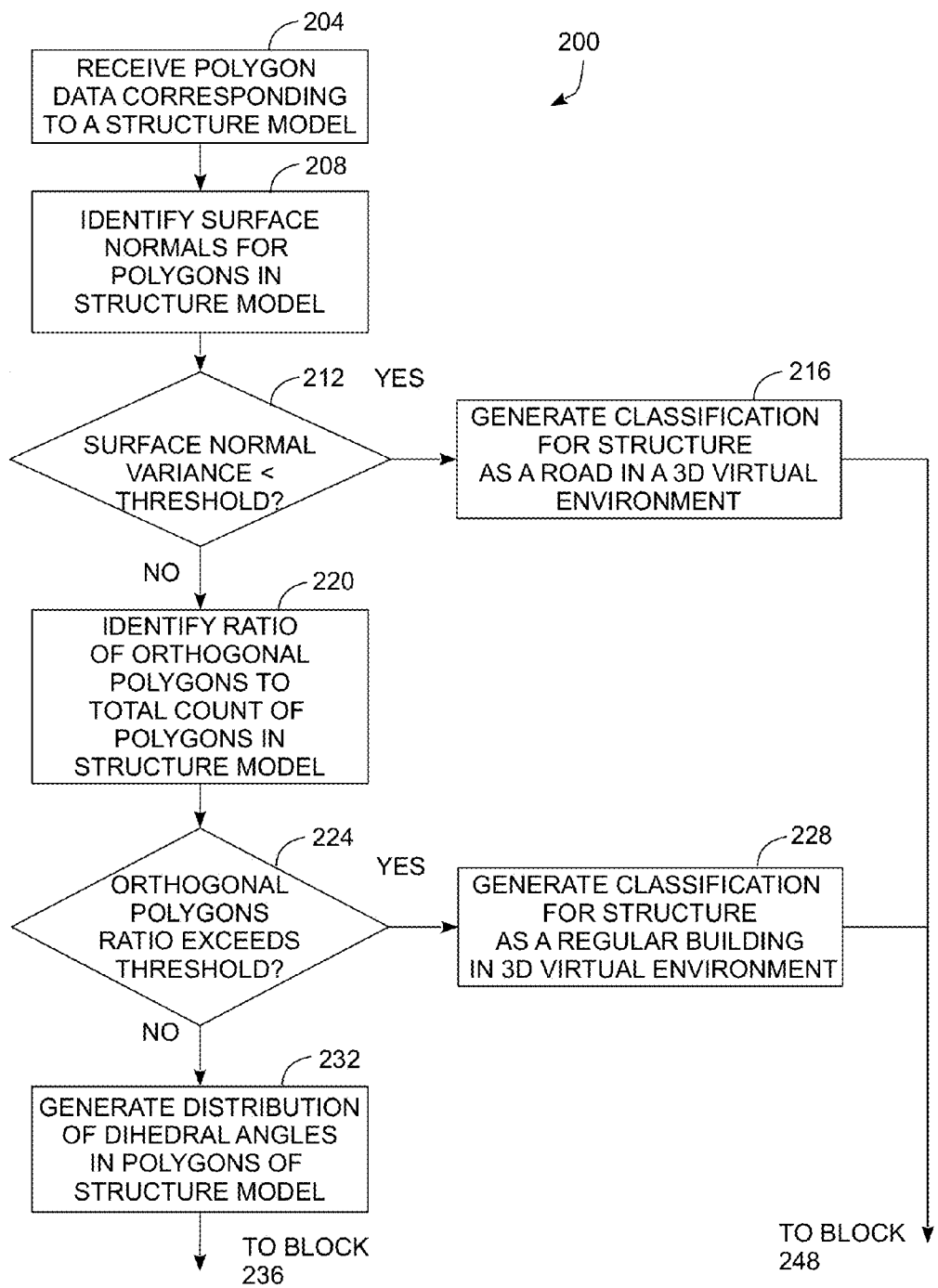
FIG. 2 is a block diagram of a process for classification and display of structures in a 3D virtual environment.
Figure 2:
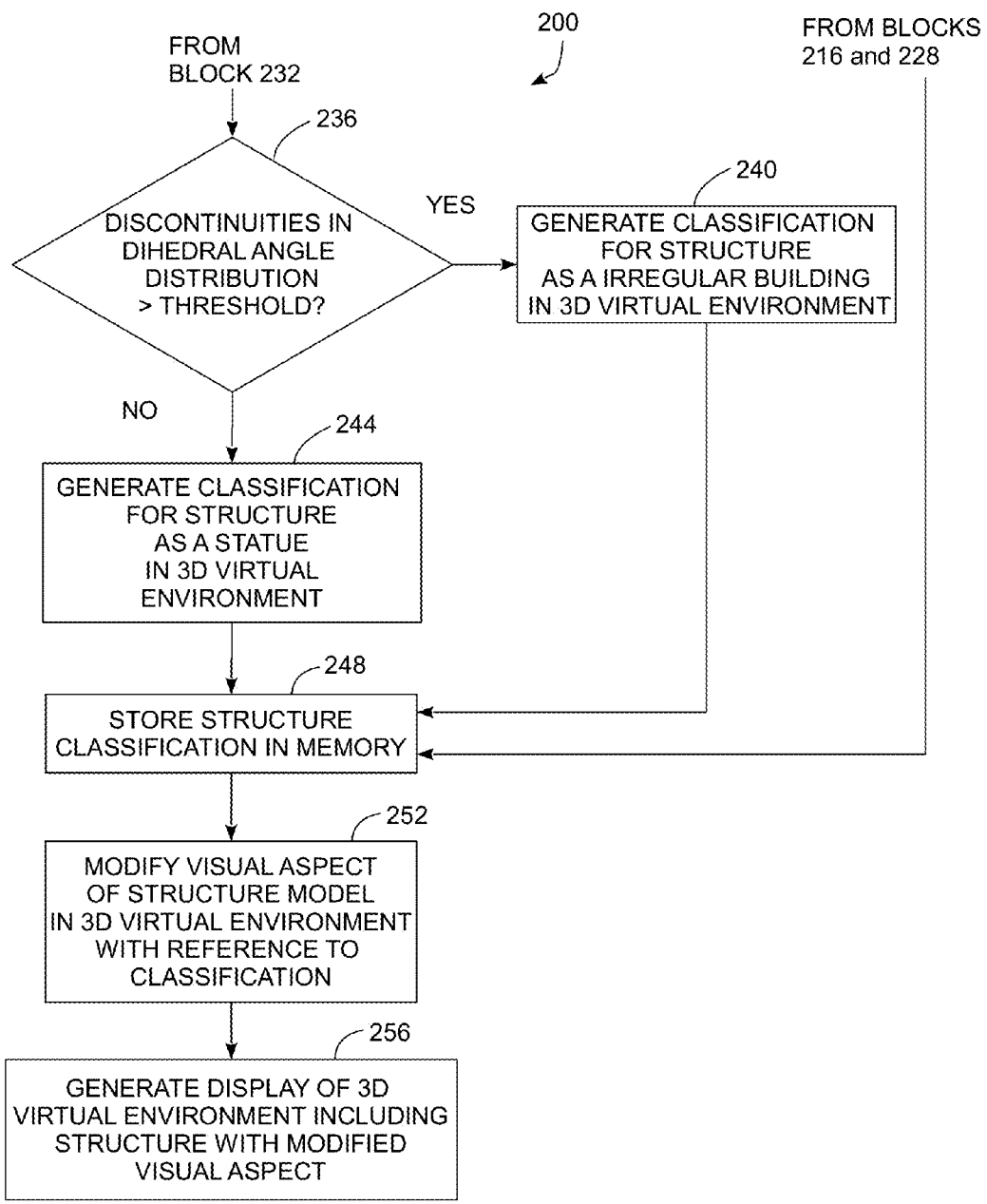

FIG. 2 depicts a process 200 for classification of structures in a virtual environment and display of the structures using one or more textures that are selected for the structure with reference to the identified classification. FIG. 2 depicts a block diagram of a process 200 for displaying the map features. In the description below, a reference to the process 200 performing some function or action refers to one or more controllers or processors that are configured with programmed instructions, which are executed by the controllers or processors, to implement the process performing the function or action or operating one or more components to perform the function or action. The process 200 is described with reference to the in-vehicle information system 104 of FIG. 1 for illustrative purposes. In the embodiment of the process 200 that is depicted in FIG. 2, the in-vehicle information 104 classifies a structure as either being a road, regular building, irregular building, or a statue.

Process 200 begins as the processor 108 receives polygon data corresponding to a structure model in a 3D virtual environment (block 204). In the in-vehicle information system 104, the cached structure data memory 124 stores polygon data corresponding to one or more structures in the structure model polygon. During operation, the in-vehicle navigation system 104 also retrieves additional structure model polygon data and geolocation coordinates for the corresponding map structures from one or more online data storage services using the network device 152. As described above, in some instances the online databases include polygon structure model data for the map structures, but do not include classifications for the type of structure. During process 200, the in-vehicle information system 104 assigns a classification to the retrieved structure model and selects textures for the structure model with reference to the assigned classification to enable generation of map displays with a uniform map layout.

Once the in-vehicle information system 104 receives the polygon data corresponding to a structure, the processor 108 identifies surface normals that correspond to each of the polygons in the structure (block 208). To generate the surface normal for a polygon, the processor 108 selects the three-dimensional coordinate data for two non-parallel sides of the polygon and performs a cross-multiplication operation on the sides. The cross-multiplication generates a vector that is a surface normal of the polygon. The surface normal vector extends in a perpendicular direction from the face of the polygon. In many 3D graphics system embodiments, the polygons that form the structure models are all triangles, and the processor 108 generates surface normals for the triangles using the three vertex coordinates in the triangle, with one vertex coordinate being used twice to represent an intersection between two sides of the triangle. In the embodiment of FIG. 1, the memory 120 includes a surface normal storage cache 150, and the processor 108 stores the generated surface normals in the cache 150. As described below, the surface normal data are used in different portions of the process 200, and the surface normal cache 150 enables retrieval of the surface normals without requiring regeneration of the surface normal data. In another embodiment, the processor 108 identifies the surface normals during multiple stages of the process 200.

Figure 4:
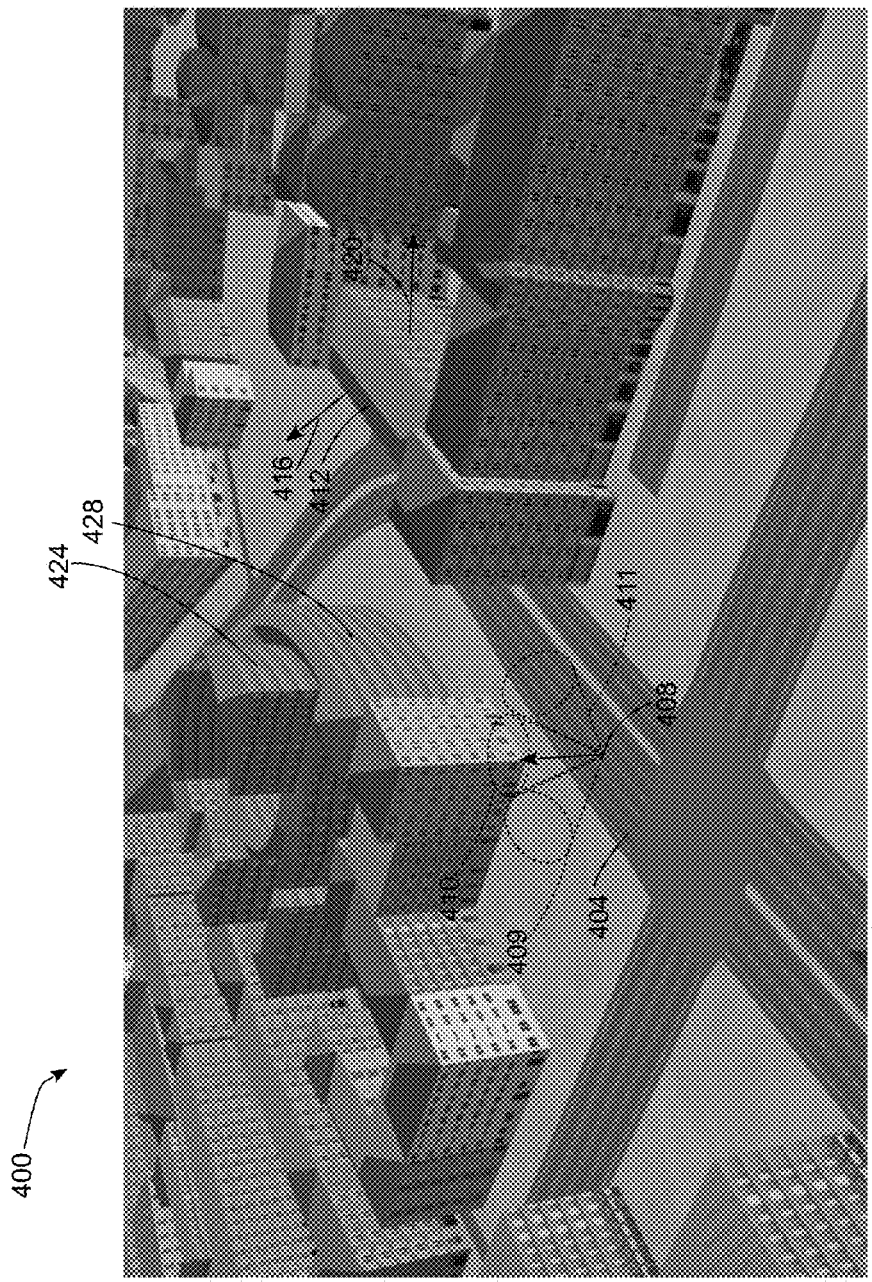
FIG. 4 is a depiction of a scene in a 3D virtual environment including structures in the virtual environment.

During process 200, if an identified variance of the surface normals for the structure is less than a predetermined variance threshold (block 212), then the structure is classified as being a road in the 3D virtual environment (block 216). FIG. 4 depicts a display 400 of a virtual environment that includes roads. In FIG. 4, a road 404 includes polygons that are formed over a surface of the terrain depicted in the virtual environment display. The surface normals, such as surface normal 408, for the road 404 have a relatively low variance because the structure model for the road 404 is formed from an approximately planar mesh of polygons that extend across the virtual environment along the path of the road. The surface normals for the road 404 have some variation due to curves and changes in terrain elevation, but the variance for the road surface normals is typically smaller than for normals that correspond to buildings. For example, the buildings 412 and 424 in FIG. 4 include a wider distribution of surface normals, including the normals 416 and 420 for polygons in the building 412.

Figure 5:
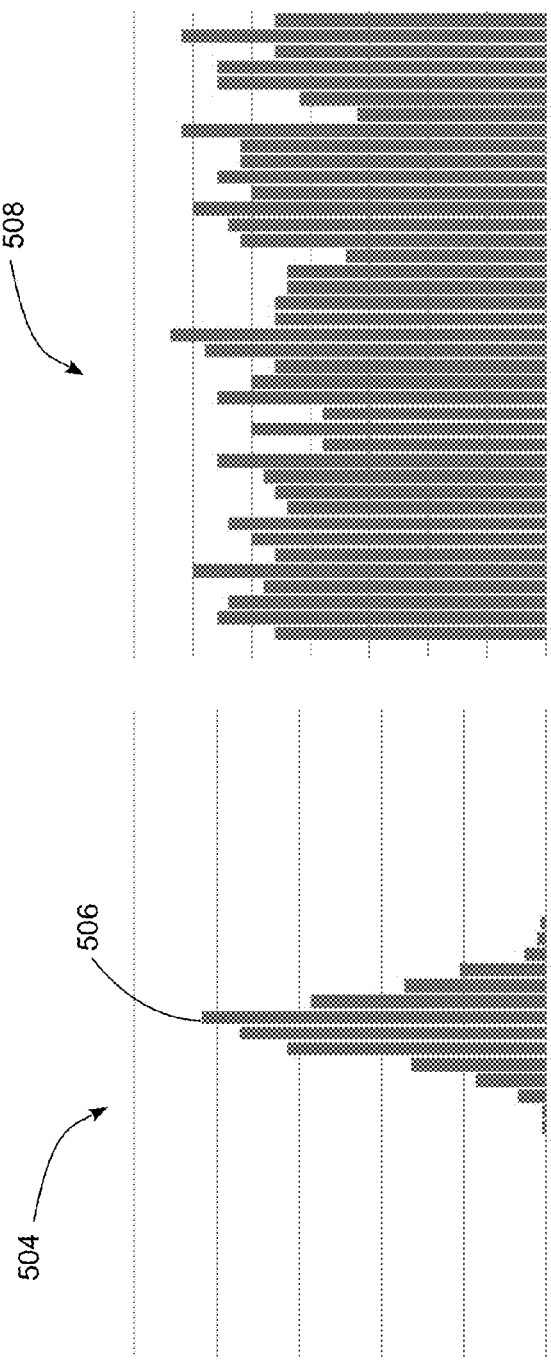
FIG. 5 is a depiction of a distribution of surface normals in polygon data for a road structure in a 3D virtual environment and a depiction of another distribution of surface normals for a non-road structure in the 3D virtual environment.

FIG. 5 depicts two examples of surface normal distributions, with one distribution 504 corresponding to a road and another distribution 508 corresponding to a structure that is not a road. The graphs 504 and 508 are histograms of the surface normal in two different structure models. Because a surface normal is a vector in a three-dimensional space, the entries along the x-axis in the histograms 504 and 508 correspond to conical regions of a predetermined size that extend from the faces of the polygons in the structure model in the three-dimensional space. For example, referring again to FIG. 4, the surface normal 408 is contained within a conical region 410 that extends from a polygon in the road structure 404. In a histogram of surface normals for the road 404, additional surface normals that are within the conical region 410 are grouped together with the surface normal 408 in the histogram distribution. Other surface normals extend through different conical regions, such as the regions 409 and 411 that are depicted in FIG. 4. The relatively planar configuration of the polygons that form the road structure 404 results in a large proportion of the surface normal vectors being contained within a relatively small number of conical regions, such as the conical region 410, in comparison to other structures such as the buildings 412 and 424 in FIG. 4.

Referring again to FIG. 5, in the graph 504, the distribution includes a relatively narrow distribution in an approximately Gaussian shape with a peak 506. By contrast, the surface normal distribution 508 for non-road structure includes a roughly uniform distribution of surface normals. In the process 200, the processor 108 identifies the variance of the histogram distribution for the identified surface normals in the structure model, and if the variance for the distribution of surface normals is less than a predetermined variance threshold (block 212), then the processor 108 identifies that the structure is a road (block 216).

If the variance of surface normals in the polygon model data exceeds the predetermined threshold (block 212), then process 200 continues for the classification of other structure types for the structure in the virtual environment. The processor 108 identifies the ratio of the number of polygon faces in the polygon data for the structure model divided by the total number of polygon faces in the structure model (block 220). The identification of the ratio is described in more detail in FIG. 3.

Figure 3:
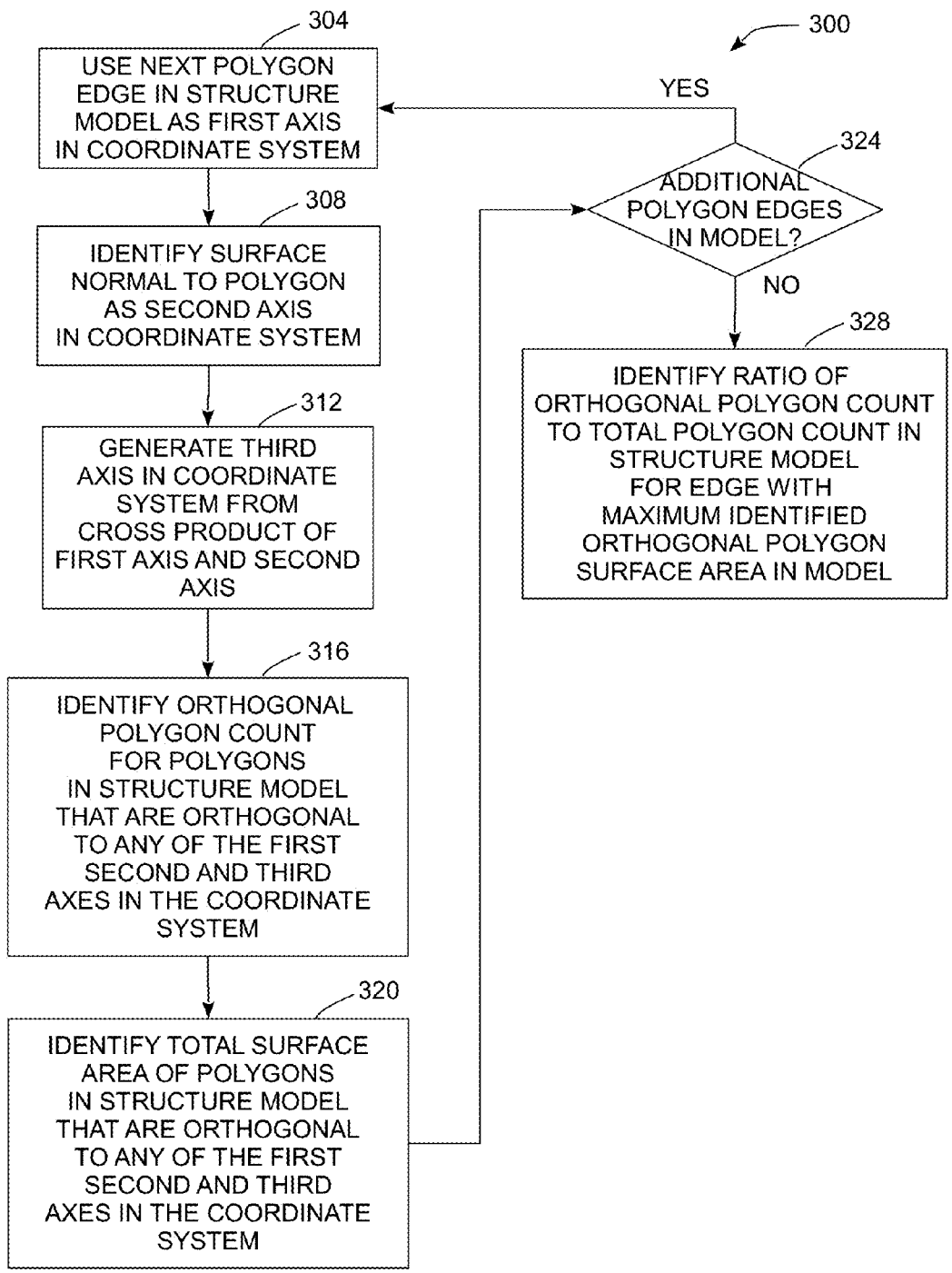
FIG. 3 is a block diagram of a process for identification of a ratio of orthogonal polygons to a total number of polygons in polygon data for a structure model.

FIG. 3 depicts a process 300 for identification of a ratio of polygons in a structure model that are orthogonal to one another divided by the total number of polygons in the model. As used herein, the term "orthogonal" as applied to polygons in a structure model refers to two or more polygons that are oriented in the structure perpendicular to one of three axes that define a three-dimensional coordinate system. Two polygons in a structure can be orthogonal without sharing a common side or vertex in the model. As used herein, orthogonal polygons also include polygons that are parallel to one another. For example, the six sides of a cube are each orthogonal to one another. Many polygon models include rectangular surfaces that are formed from multiple triangles that are arranged in parallel to form the rectangle. The triangles that form the rectangular surface are orthogonal to one another because they can be arranged on a single plane with a single axis in the three-dimensional coordinate system being perpendicular to each of the polygons. In the description below, a reference to the process 300 performing or doing some function or action refers to one or more controllers or processors that are configured with programmed instructions, which are executed by the controllers or processors to implement the process performing the function or action or operating one or more components to perform the function or action. The process 300 is described with reference to the in-vehicle information system 104 of FIG. 1 for illustrative purposes.

Figure 6:
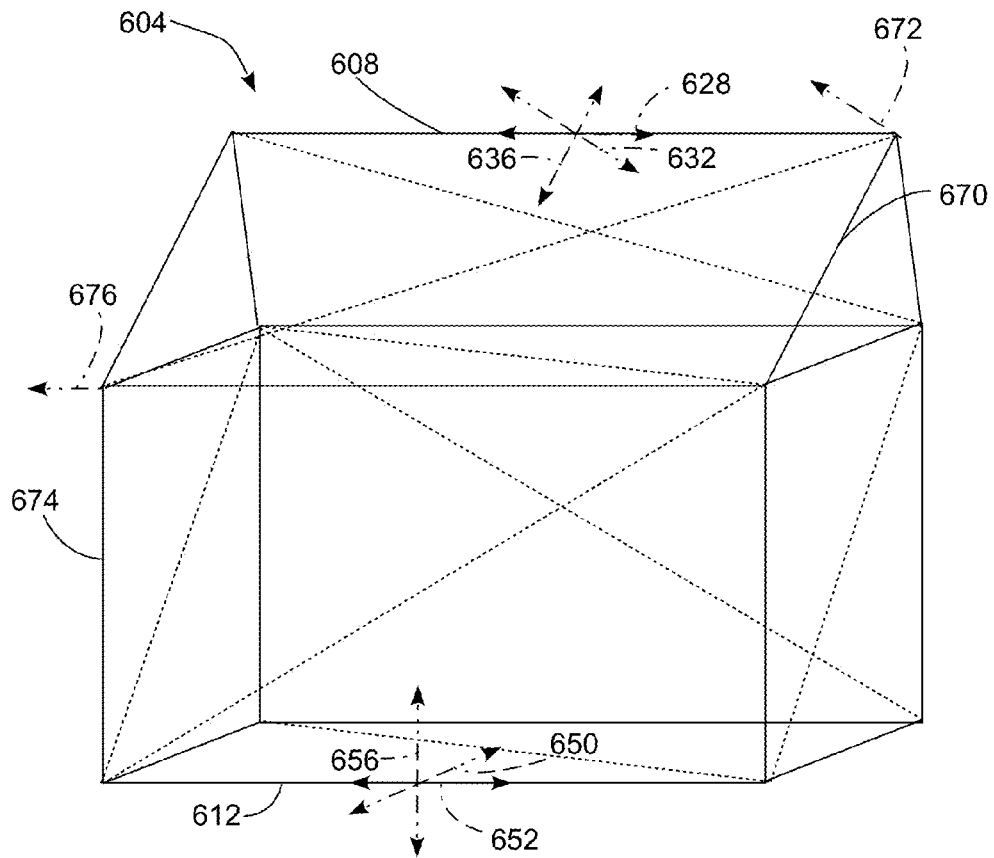
FIG. 6 is a view of polygons that form a regular building structure in a 3D virtual environment.

The process 300 begins with selection of a single side of a polygon in the polygon data for the structure model and the generation of a first axis in a 3D coordinate space from the selected side (block 304). FIG. 6 depicts a graphical view of an illustrative structure model 604 that is formed from a plurality of polygons. In FIG. 6, the polygons in the structure model 604 form a regular building in the virtual environment. In FIG. 6, solid lines represent the visible edges of the structure 604 as the structure 604 is depicted in a virtual environment, while the dashed lines indicate the interior edges of triangles in the polygon model. Some triangles in the structure model 604 are arranged together to form larger visible polygons such as rectangles in the structure 604. During process 300, the processor 108 selects the edges in the polygons that form the structure model 604 and generates a three-dimensional coordinate system from each side in an iterative manner. For example, during one iteration of the processing described with reference to block 304, the processor 108 selects the edge 608 in the structure model 604. The processor 108 generates a first axis 628 in parallel with the side 608. During another iteration of the process 300, the processor 108 selects the edge 612 and generates the first axis 652 in parallel with the edge 612.

Process 300 continues as the processor 108 generates a second axis in a 3D coordinate system corresponding to the selected edge of the polygon in the structure (block 308). The processor 108 identifies the second axis as a surface normal of the polygon that includes the selected edge that forms the basis for the first axis. As described above, the processor 108 generates the surface normal for triangles as a cross-product of two edges in the triangle. During process 300, the processor 108 generates the normal for the second axis as the cross product of the selected side that forms the first axis and either one of the other two sides of the triangle that includes the selected side. In FIG. 6, during one iteration of the process 300 the process 108 generates the second axis 632 corresponding to the side 608 and first axis 628, and in another iteration of the process 300 the processor 108 generates the second axis 650 corresponding to the side 612 and first axis 652.

Process 300 continues with generation of a third axis for the coordinate system that is generated for the selected edge (block 312). In one embodiment of the process 300, the processor 108 performs a cross-multiplication between the first axis and the second axis to generate the third axis. In FIG. 6, the processor 108 generates the third axis 636 from the cross-product of the axes 628 and 632 in one iteration of the process 300, and the processor 108 generates the third axis 656 from the cross-product of the axes 652 and 650 in another iteration of the process 300.

During each iteration of the process 300, the processor 108 identifies a count of the polygons in the model that are orthogonal to one of the generated three axes (block 316). At least only one polygon in the model is orthogonal to the axes in each iteration because the axes are generated from one side of one of the polygons in the structure model. In one embodiment, the processor 108 identifies the other orthogonal polygons in the model through generation of surface normals for each of the remaining polygons in the model. If a surface normal for a polygon is parallel to any one of the first, second, and third axes, then the polygon is orthogonal to the original polygon with the side that is used to generate the three axes. In the example of FIG. 6, the processor 108 generates the surface normals for each of the polygons in the structure model 604 and identifies whether the surface normal is parallel to any one of the three axes. For example, in one iteration of the process 300 the processor identifies that surface normal 672 for the polygon 670 is parallel to the axis 632 during one iteration of the process 300, and the processor 108 identifies that the surface normal 676 for the polygon 674 is parallel to the axis 652 during another iteration of the process 300.

In addition to identifying the number of polygons that are orthogonal to the first, second, and third axes in the three-dimensional coordinate system, process 300 also includes identification of a sum of the surface areas for the orthogonal polygons (block 320). In the in-vehicle information system 104, the processor 108 identifies the surface area for each orthogonal polygon using geometric techniques that are known to the art. For example, the processor 108 identifies the area of triangles using the formula of A=½b*h where b and h represent the base and height of the triangle. In one embodiment, the processor 108 tessellates more complex polygons into a set of triangles to identify the total surface area of the polygon as a sum of the surface areas of the smaller triangles.

Process 300 continues in an iterative manner for each edge in the polygon data for the structure model (block 324). During each iteration of process 300, the processor 108 identifies whether the total surface area of the orthogonal polygons exceeds the maximum identified surface area from any earlier iterations of the process 300. The processor 108 stores the maximum surface area in association with the count of orthogonal polygons that are identified in association with the maximum surface area. If processor 108 identifies a larger total surface area during another iteration of the process 300, then the processor 108 updates the maximum surface area and associated orthogonal polygon count. The process 300 continues to process each side of the polygons in the structure model (block 324), and the processor 108 identifies the ratio of orthogonal polygons to the total number of polygons in the structure model data using the polygon count that is associated with the maximum orthogonal polygon surface area (block 328).

As described above, the process 300 identifies the number of orthogonal polygons in the polygon data for the structure model. This identification is made using the maximum surface area of orthogonal polygons as a constraint for selecting a polygon for use as the basis for generating the first, second, and third coordinate axes. The maximum surface area constraint is useful in complex structures that include a large number of orthogonal polygons with small surface areas to ensure that a large number of small polygons in the structure do not result in a misclassification of the structure. The ratio that is identified in the process 300 is used in the continued processing of the process 200.

Referring again to the process 200 in FIG. 2, if the identified ratio of orthogonal polygon faces to total polygon faces in the polygon data for the structure model exceeds a predetermined threshold (block 224), then the processor 108 classifies the structure as a regular building (block 228). The term "regular building" applies to the total proportion of 90° corners that are present in the building model. The orthogonal polygons meet at 90° angles, while non-orthogonal polygons meet at angles other than 90°. Many buildings and other structures in the real world include a high proportion of 90° angle corners, and the corresponding polygon data for the structure models in the virtual environment also include the 90° corners. In one configuration, the ratio threshold is 0.8, which is to say that if 80% or more of the polygons in the structure are orthogonal, then the processor 108 classifies the structure as a regular building.

If the identified ratio of orthogonal polygons to total polygons in the structure model data is below the predetermined threshold (block 224), then process 200 continues as the processor 108 generates a distribution of dihedral angles in the polygon data of the structure model (block 232). The dihedral angles refer to angles between adjoining polygons in the structure model. If one of the polygons is rotated through the dihedral angle, then the two polygons are parallel to one another. One method for identifying the dihedral angle between two polygons includes identification of a relationship between surface normals to the two polygons. For example, given polygons A and B with surface normals $U_A$ and $U_b$, respectively, the dihedral angle between A and B is provided by the following equation, with two equivalent expressions for the dihedral angle:

$$\varphi_{AB} = \arccos\left(\frac{U_A \cdot U_B}{|U_A||U_B|}\right).$$

The processor 108 identifies the dihedral angles between each pair of adjacent polygons in the structure model, and generates a sorted distribution of the angles.

Process 200 continues as the processor then identifies whether the number and magnitude of discontinuities in the distribution of dihedral angles is greater than or less than a predetermined threshold to classify the structure as either an irregular building or a statue (block 236). In one embodiment, only discontinuities between dihedral angles that are larger than a predetermined angle size are used to classify the irregular buildings and statues. In one embodiment, only discontinuities between dihedral angles that are greater than two radians are used to classify the structure model. In the context of the dihedral angle distributions for structure models, the term "discontinuity" refers to a difference between the sizes of adjacent dihedral angles in the sorted dihedral angle distribution. The maximum difference between two adjacent dihedral angle entries in the sorted dihedral angle data for a given structure model is referred to as the maximum discontinuity for the structure model. Structures that are formed with smooth curves, such as statues, typically have smaller discontinuities between dihedral angles, while irregular buildings tend to have more abrupt changes between dihedral angles.

Figure 7:
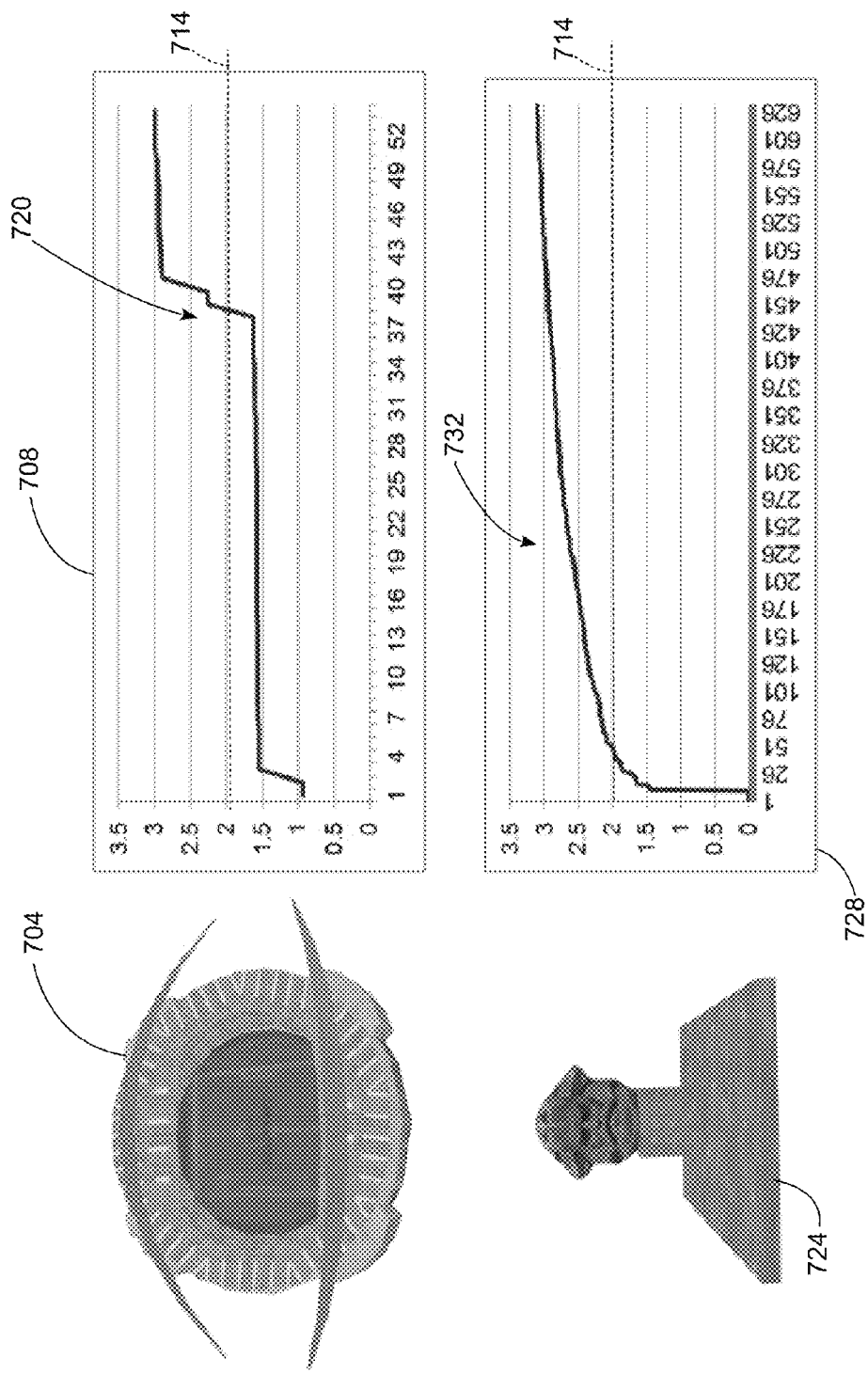
FIG. 7 is a first depiction of an irregular building structure model in a 3D virtual environment and a corresponding sorted distribution of dihedral angles between polygons in the irregular building structure model and another depiction a statue structure model with a corresponding sorted distribution of dihedral angles between polygons in the statue structure model.

FIG. 7 depicts two structure models 704 and 724 with respective graphs 708 and 728 of corresponding dihedral angle distributions that the processor 108 generates during the process 200 for the structure models. In FIG. 7, the structure 704 is an example of an irregular building, which is a stadium as illustrated in FIG. 7. The irregular building 704 includes a comparatively low number of orthogonal polygons due to the curved outer circumference of the structure. The graph 708 depicts a distribution of the dihedral angles in the structure model 704, with the y-axis in the graph 708 depicting the dihedral angle in radians, and the x-axis representing an index number assigned to each dihedral angle. The graph 708 increases monotonically to reflect the distribution of dihedral angles in the structure model 704. In the example of FIG. 7, the processor 108 identifies discontinuities in dihedral angles that are larger than two radians in size, which are depicted by the portion of the graph 708 that is above the threshold 714. The distribution depicted in graph 708 includes large discontinuities in the area 720. In FIG. 7, the structure 724 is a sculpted statue. The dihedral angle distribution graph 728 for the statue 724 includes a comparatively smooth distribution in the region 732 that is above the minimum dihedral angle threshold 714. In the graph 728, the changes between adjacent dihedral angles in the distribution for the structure model are smaller than an predetermined threshold, and the graph 728 does not include the large discontinuities 720 that are depicted in the graph 708 for the irregular building 704.

Referring again to FIG. 2, if the identified maximum discontinuity between the adjacent dihedral angles of the structure exceed the predetermined threshold (block 236), then the processor 108 classifies the structure as an irregular building in the virtual environment (block 240). If, however, the identified discontinuities in the dihedral angles of the structure are less than the predetermined threshold (block 236), then the processor 108 classifies the structure model as a statue in the virtual environment (block 244).

As described above in the description of blocks 216, 228, 240, and 244, the in-vehicle information system 104 classifies the polygon data for the structure model as one of a road, regular building, irregular building, or a statue, respectively. Once the structure is classified, a data identifier for the classification is stored in a memory in association with the structure (block 248). In the in-vehicle information system 104, the processor 108 stores classification identification data for the structure in the cached structure classifications region 126 in the memory 120. The structure classification data are stored in the structure classification cache 126 in association with the cached structure data 124, and the memory 120 retains the classification for the structure during the display of graphics and other operations in the 3D virtual environment. In one embodiment, the structure classification data are predetermined text strings that conform to a structured data format such as an extensible markup language (XML) format. In another embodiment, the structure classification is a numeric or other binary data identifier.

During process 200, the in-vehicle information system 104 is configured to display virtual environments including the structures, which are displayed using the polygon data to generate a 3D display of the structure. The in-vehicle information system 104 uses the identified classification for the structure to modify at least one visual aspect of the structure in the 3D virtual environment (block 252). As used herein, the term "visual aspect" refers to any adjustment to the display of the structure model that is visually perceptible to a typical user of the in-vehicle information system 104. Examples of visual aspects including, but are not limited to size, shape, color, location, animation, lighting, and textures for the structural model. For example, in one operating mode the classification of an object affects a priority for displaying the object. A road classification is assigned high priority in a navigation application program, while regular buildings are assigned lower priorities. The lower-priority regular buildings are optionally displayed with reduced size, without textures to appear as single-color forms, or are flattened to be shown as 2D graphics instead of full three-dimensional models. In another operating mode, irregular buildings and statues are highlighted with additional lighting to increase the visibility of the structure since irregular buildings and statues are often used as landmarks during navigation.

In another operating mode in the process 200, the in-vehicle information system 104 selects and applies graphical textures to the structure models with reference to the classification for each model to modify the visual aspects of a wide range of models to form a more uniform appearance for different structures in the 3D virtual environment. The processor 108 applies a common set of textures to structures in the virtual environment with the same classification to enable generation of a virtual environment with a more uniform appearance. Some existing mapping and navigation applications generate textures for a structure using photographic data to provide a so-called "photorealistic" depiction of the structure in the virtual environment with the same appearance as in the physical world. While photorealistic display of a structure is used in some mapping programs, the photorealistic graphics are often more difficult for a vehicle operator or other vehicle occupant to interpret in a short period of time. In the in-vehicle information system 104, the processor 108 applies a comparatively limited set of textures to the different structures in the virtual environment with reference to the classification for each structure in order to provide a simplified visual depiction of the 3D virtual environment to the vehicle occupants. The processor 108 selects textures for the structure from the texture memory 134 with reference to the identified classification for the structure In the in-vehicle information system 104, the processor 108 selects one or more road textures 136, regular building textures 140, irregular building textures 144, and statue textures 148 with reference to the identified classification for the structure.

Process 200 continues as the in-vehicle information system 104 generates a display of the 3D virtual environment including a depiction of the structure model with the modified visual aspect (block 256). The GPU in 116 in the processor 108 generates a display of the 3D virtual environment including the structure model with the modified visual aspect through the display device 132 for the user to view. In an embodiment where the processor 108 applies textures with reference to the classification for the structure model, the processor 108 applies the textures to the polygons in the structure using, for example, texture-mapping techniques that are known to the art, and generates a display of the 3D virtual environment including the textured structure.

Referring again to FIG. 4, the display 400 of the virtual environment includes the road 404, regular buildings such as the regular building 412, and an irregular building 424. As depicted in FIG. 4, the textures that are applied to the road 404 depict a simplified view of a road including lane marks, but are not photorealistic renderings of the road in the physical world that is represented by the road structure model 404 in the display 400. Similarly, the buildings 412 and 424 have simplified wall and roof textures applied to selected polygons in each structure to generate a graphical depiction of a building, but without rendering photographic details of the building exterior. The processor 108 applies textures to a curved wall 428 in the irregular building 424 to accentuate the curved shape of the irregular building 424 instead of attempting to generate a photographic display of the curved wall 428 in the irregular building 424. During operation of the in-vehicle information system 104, the simplified depictions of the structures in the virtual environment enable the vehicle occupants to focus on the task of navigation with fewer distractions because the in-vehicle information system 104 classifies structures in the 3D virtual environment and displays the structures with the predetermined textures.

In one embodiment, the in-vehicle information system 104 in the in-vehicle information system 104 only performs the classification process 200 once for structure models that are previously unclassified. In the embodiment of FIG. 1, processor 108 stores the classification for each structure in the structure classification cache 126, which stores the classification in association with the structure model polygon data 124 for each structure that is stored in the memory 120. During operation of a mapping or navigation application, the processor 108 loads the structure polygon data from the memory 120, and applies an appropriate set of textures from the textures memory 134 corresponding to roads, regular buildings, irregular buildings, and statues with reference to the previously identified classification for the structure.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method for classification of and display of three-dimensional structures in a virtual environment comprising:
   identifying a plurality of polygons in a structure located in a virtual environment;
   generating data corresponding to a plurality of surface normals, each surface normal corresponding to one polygon in the plurality of polygons in the structure;
   identifying a variance of a distribution of the plurality of surface normals;
   generating a first classification for the object in response to the identified variance being below a first predetermined threshold; and
   generating with a display device a visual depiction of the structure in the virtual environment with at least one visual aspect of the structure being modified with reference to the first classification.

2. The method of claim 1 further comprising:
   selecting a first texture from the plurality of textures stored in the memory with reference to the first classification; and
   generating with the display device the visual depiction of the structure in the virtual environment with the first texture mapped to the structure.

3. The method of claim 1, the first classification indicating that the structure is a road in the virtual environment.

4. The method of claim 1, the identification of the distribution of the plurality of surface normals comprising:
   identifying the orientation of each surface normal in the plurality of surface normals;
   identifying one conical region in a plurality of conical regions extending from the structure that includes each surface normal in the plurality of surface normals, the identification being made with reference to the identified orientation of each surface normal in the plurality of surface normals; and
   generating the distribution as a histogram of a number of the surface normals with orientations corresponding to each conical region in the plurality of conical regions.

5. The method of claim 1 further comprising:
   identifying a number of polygons in the structure that are arranged in an orthogonal orientation relative to a plane of a selected polygon in the structure in response to the identified variance being above the first predetermined threshold;
   identifying a ratio between the identified number of polygons and a total number of polygons in the structure;
   generating a second classification for the structure in response to the identified ratio being above a second predetermined threshold; and
   generating with the display device a visual depiction of the structure in the virtual environment with at least one visual aspect of the structure being modified with reference to the second classification.

6. The method of claim 5 further comprising:
   selecting a second texture from the plurality of textures stored in the memory with reference to the second classification; and
   generating with the display device the visual depiction of the structure in the virtual environment with the second texture mapped to the structure.

7. The method of claim 5 further comprising:
   generating three-dimensional axes extending from a plane defined by each polygon in the plurality of polygons in the structure;
   identifying a total surface area of the plurality of polygons in the structure that are in an orthogonal orientation to one of the three-dimensional axes for each of the plurality of polygons in the structure; and
   identifying the selected polygon as one polygon in the plurality of polygons in the structure with a maximum total surface area for the identified orthogonal polygons.

8. The method of claim 5, the second classification indicating that the structure is a regular building in the virtual environment.

9. The method of claim 5 further comprising:
   identifying a plurality of dihedral angles formed between adjacent polygons in the plurality of polygons in the structure in response to the identified ratio being below the second predetermined threshold;
   ordering the plurality of dihedral angles with reference to an identified size for each dihedral angle in the plurality of dihedral angles;
   identifying a maximum difference between two consecutive dihedral angles in the ordered plurality of dihedral angles;
   generating a third classification for the structure in response to the identified maximum difference being below a third predetermined threshold; and
   generating with the display device a visual depiction of the structure in the virtual environment with at least one visual aspect of the structure being modified with reference to the third classification.

10. The method of claim 9 further comprising:
    selecting a third texture from the plurality of textures stored in the memory with reference to the third classification; and
    generating with the display device the visual depiction of the structure in the virtual environment with the third texture mapped to the structure.

11. The method of claim 9, the third classification indicating that the structure is a statue in the virtual environment.

12. The method of claim 9 further comprising:
    generating a fourth classification for the structure in response to the identified maximum difference being above the third predetermined threshold; and
    generating with the display device a visual depiction of the structure in the virtual environment with at least one visual aspect of the structure being modified with reference to the fourth classification.

13. The method of claim 12 further comprising:
    selecting a fourth texture from a plurality of textures stored in the memory with reference to the fourth classification; and
    generating with the display device a display of the structure in the virtual environment with the fourth texture mapped to the structure.

14. The method of claim 12, the fourth classification indicating that the structure is an irregular building in the virtual environment.

15. An in-vehicle information system configured to classify and generate a display of structures in a virtual environment comprising:
- a memory configured to store:
  - data corresponding to a plurality of polygons in a structure in a virtual environment; and
  - data corresponding to a plurality of textures for structures in the virtual environment;
- a display device configured to generate a display of the structure in the virtual environment; and
- a processor operatively connected to the memory and the display, the processor being configured to:
- generate data corresponding to a plurality of surface normals for the data corresponding to the plurality of polygons in the structure, each surface normal corresponding to one polygon in the plurality of polygons in the structure;
- identify a variance of a distribution of the plurality of surface normals;
- generate a first classification for the object in response to the identified variance being below a first predetermined threshold; and
- generate with the display device a visual depiction of the structure in the virtual environment with at least one visual aspect of the structure being modified with reference to the first classification.

16. The system of claim 15, the processor being further configured to:
- select a first texture from the plurality of textures stored in the memory with reference to the first classification; and
- generate with the display device the visual depiction of the structure in the virtual environment with the first texture mapped to the structure.

17. The system of claim 16 wherein the first texture depicts a portion of a surface of a road in the virtual environment.

18. The system of claim 15, the processor being further configured to:
- identify the orientation of each surface normal in the plurality of surface normals;
- identify one conical region in a plurality of conical regions extending from the structure that includes each surface normal in the plurality of surface normals, the identification being made with reference to the identified orientation of each surface normal in the plurality of surface normals; and
- generate the distribution as a histogram of a number of the surface normals with orientations corresponding to each conical region in the plurality of conical regions.

19. The system of claim 15, the processor being further configured to:
- identify a number of polygons in the structure that are arranged in an orthogonal orientation relative to a plane of a selected polygon in the structure in response to the identified variance being above the first predetermined threshold;
- identify a ratio between the identified number of polygons and a total number of polygons in the structure;
- generate a second classification for the structure in response to the identified ratio being above a second predetermined threshold; and
- generate with the display device a visual depiction of the structure in the virtual environment with at least one visual aspect of the structure being modified with reference to the second classification.

20. The system of claim 19, the processor being further configured to:
- select a second texture from the plurality of textures stored in the memory with reference to the second classification; and
- generate with the display device the visual depiction of the structure in the virtual environment with the second texture mapped to the structure.

21. The system of claim 19, the processor being further configured to:
- generate three-dimensional axes extending from a plane defined by each polygon in the plurality of polygons in the structure;
- identify a total surface area of the plurality of polygons in the structure that are in an orthogonal orientation to one of the three-dimensional axes for each of the plurality of polygons in the structure; and
- identify the selected polygon as one polygon in the plurality of polygons in the structure with a maximum total surface area for the orthogonal polygons.

22. The system of claim 20 wherein the second texture depicts a portion of a surface of a regular building in the virtual environment.

23. The system of claim 19, the processor being further configured to:
- identify a plurality of dihedral angles formed between adjacent polygons in the plurality of polygons in the structure in response to the identified ratio being below the second predetermined threshold;
- order the plurality of dihedral angles with reference to an identified size for each dihedral angle in the plurality of dihedral angles;
- identify a maximum difference between two consecutive dihedral angles in the ordered plurality of dihedral angles;
- generate a third classification for the structure in response to the identified maximum difference being below a third predetermined threshold; and
- generate with the display device a visual depiction of the structure in the virtual environment with at least one visual aspect of the structure being modified with reference to the third classification.

24. The system of claim 23, the processor being further configured to:
- select a third texture from the plurality of textures stored in the memory with reference to the third classification; and
- generate with the display device the visual depiction of the structure in the virtual environment with the third texture mapped to the structure.

25. The system of claim 24 wherein the third texture depicts a portion of a surface of a statue in the virtual environment.

26. The system of claim 23, the processor being further configured to:
- generate a fourth classification for the structure in response to the identified maximum difference being above the third predetermined threshold; and
- generate with the display device a visual depiction of the structure in the virtual environment with at least one visual aspect of the structure being modified with reference to the fourth classification.

27. The system of claim 26, the processor being further configured to:
- select a fourth texture from a plurality of textures stored in the memory with reference to the fourth classification; and generate, with the display device, a display of the structure in the virtual environment with the fourth texture mapped to the structure.

28. The system of claim 27 wherein the fourth texture depicts a portion of a surface of an irregular building in the virtual environment.

* * * * *